US008175849B2

(12) United States Patent
Yamashita et al.

(10) Patent No.: US 8,175,849 B2

(45) Date of Patent: May 8, 2012

(54) PREDICTIVE FAILURE REPORTING SYSTEM, PREDICTIVE FAILURE REPORTING METHOD, AND METHOD FOR MAINTAINING IMAGE FORMING APPARATUS

(75) Inventors: Masahide Yamashita, Tokyo (JP); Yasushi Nakazato, Tokyo (JP); Osamu Satoh, Kanagawa (JP); Kohji Ue, Kanagawa (JP); Jun Yamane, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 288 days.

(21) Appl. No.: 12/566,332

(22) Filed: Sep. 24, 2009

(65) Prior Publication Data

US 2010/0094594 A1 Apr. 15, 2010

(30) Foreign Application Priority Data

Oct. 9, 2008 (JP) ................................ 2008-262615

(51) Int. Cl.
*G06F 19/00* (2011.01)

(52) U.S. Cl. ...................................................... 702/184

(58) Field of Classification Search ........... 702/182–185
See application file for complete search history.

(56) References Cited

U.S. PATENT DOCUMENTS

| | | | |
|---|---|---|---|
| 7,110,917 | B2 | 9/2006 | Matsuura et al. |
| 7,184,674 | B2 | 2/2007 | Satoh et al. |
| 7,203,431 | B2 | 4/2007 | Shoji et al. |
| 7,218,879 | B2 | 5/2007 | Enoki et al. |
| 7,327,962 | B2 | 2/2008 | Shoji et al. |
| 7,340,204 | B2 | 3/2008 | Nakazato et al. |
| 7,457,550 | B2 | 11/2008 | Shoji et al. |
| 2005/0058474 | A1 | 3/2005 | Watanabe et al. |
| 2005/0286916 | A1 | 12/2005 | Nakazato et al. |
| 2006/0294252 | A1 | 12/2006 | Shoji et al. |
| 2007/0224528 | A1 | 9/2007 | Yamashita et al. |
| 2007/0258723 | A1 | 11/2007 | Nakazato et al. |
| 2008/0068639 | A1 | 3/2008 | Satoh et al. |
| 2008/0075476 | A1 | 3/2008 | Nakazato et al. |
| 2008/0199193 | A1 | 8/2008 | Nakazato et al. |
| 2008/0281596 | A1 | 11/2008 | Kim et al. |
| 2009/0033993 | A1 | 2/2009 | Nakazato et al. |
| 2009/0034990 | A1 | 2/2009 | Nakazato et al. |

(Continued)

FOREIGN PATENT DOCUMENTS

JP 5-100517 4/1993

(Continued)

OTHER PUBLICATIONS

U.S. Appl. No. 12/481,237, filed Jun. 9, 2009, Yasushi Nakazato, et al.

(Continued)

*Primary Examiner* — Edward Raymond

(74) *Attorney, Agent, or Firm* — Oblon, Spivak, McClelland, Maier & Neustadt, L.L.P.

(57) ABSTRACT

A determining unit determines whether the printer is in the predictive failure state based on the internal information of the printer acquired by the information acquiring unit. A failure risk computing unit performs a failure risk determination process for determining the size of failure risk of the printer when the printer is in the predictive failure state. The determination result is reported to a maintenance person or a user. In this way, the maintenance person or the user who receives the report can definitely grasp a degree of urgency of maintenance at that point.

14 Claims, 11 Drawing Sheets

U.S. PATENT DOCUMENTS

| | | | | |
|---|---|---|---|---|
| 2009/0041481 | A1 | 2/2009 | Iida et al. | |
| 2009/0052912 | A1 | 2/2009 | Soji et al. | |
| 2009/0190939 | A1 | 7/2009 | Satoh et al. | |
| 2009/0196634 | A1 | 8/2009 | Satoh et al. | |
| 2009/0210278 | A1 * | 8/2009 | Kamisuwa et al. | 705/8 |

FOREIGN PATENT DOCUMENTS

| | | |
|---|---|---|
| JP | 7-36323 | 2/1995 |
| JP | 7-104616 | 4/1995 |
| JP | 2000-89623 | 3/2000 |
| JP | 2001-175328 | 6/2001 |
| JP | 3617686 | 11/2004 |
| JP | 2007-328645 | 12/2007 |

OTHER PUBLICATIONS

U.S. Appl. No. 12/487,835, filed Jun. 19, 2009, Yasushi Nakazato, et al.

U.S. Appl. No. 12/486,881, filed Jun. 18, 2009, Kohji Ue, et al.

* cited by examiner

PREDICTIVE FAILURE REPORTING SYSTEM, PREDICTIVE FAILURE REPORTING METHOD, AND METHOD FOR MAINTAINING IMAGE FORMING APPARATUS

CROSS-REFERENCE TO RELATED APPLICATIONS

The present application claims priority to and incorporates by reference the entire contents of Japanese Patent Application No. 2008-262615 filed in Japan on Oct. 9, 2008.

BACKGROUND OF THE INVENTION

1. Field of the Invention

The present invention relates to a technology for determining whether a target device such as an image forming apparatus is in a predictive failure state based on internal information of the target device.

2. Description of the Related Art

An image forming apparatus employing electrophotographic technology forms an electrostatic latent image induced by electrostatic charges on an image carrier such as photoconductive materials and attaches charged toner particles to the electrostatic latent image to form a visible image. The visible image formed of toner is finally transferred to a recording material such as paper and then is firmly established on the recording material by heat, pressure, solvent gas, and the like to become an output image. In such an image forming apparatus, the state of device associated with a series of imaging processes for forming an image changes gradually in accordance with the status of use. Therefore, to continue to provide a constant-quality image, it is necessary to regularly check out the state of various devices and unit in the image forming apparatus and perform parts replacement and supplement of consumables depending on the check result. This maintenance work is necessary in order to ensure smooth operation of the image forming apparatus.

A work for maintaining an image forming apparatus can be roughly classified into a regular maintenance that is performed regularly and an irregular maintenance that is performed irregularly when the image forming apparatus has failure or abnormality. The regular maintenance should be performed before the image forming apparatus does not reach an unavailable state. Therefore, parts replacement or the like is performed in a state where the spare available time of each part has a sufficient margin. As a result, the replaced part cannot be used for the spare available time. In this way, the number of parts replacements increases until the use of one image forming apparatus is finished. When the number of maintenances increases, a maintenance time increases. It leads to decrease productivity per one image forming apparatus.

In recent years, there has been proposed a system that monitors the state of an image forming apparatus, predicts whether the image forming apparatus is going to fail based on the change of state, and performs an irregular maintenance in accordance with the prediction result. A related technology has been disclosed in, for example, Japanese Patent Application Laid-open No. 2001-175328, Japanese Patent Application Laid-open No. 2007-328645, and Japanese Patent Application Laid-open No. H8-154161. In this way, by predicting the failure of the image forming apparatus and performing an irregular maintenance in place of a regular maintenance, various problems can be solved, such as the waste of spare available time or the degradation of productivity caused by the regular maintenance. Therefore, such a system has great social and economical values. Furthermore, this system has an advantage that an environmental impact can be largely reduced because an amount of use resource is largely reduced.

In general, the states of image forming apparatuses differ greatly depending on the status of use of each image forming apparatus, such as the type of output image, the number of outputs, an output-time interval, or a use environment. Therefore, to determine the state of each image forming apparatus with high precision, it is important that the state of each image forming apparatus should be grasped based on the internal information of each image forming apparatus. There is known a conventional method for determining whether an image forming apparatus is in a state (predictive failure state) indicative of a predictive failure based on the internal information of the image forming apparatus. However, in the conventional method, only two-valued information indicating whether a predictive failure is present or not can be obtained. In such two-valued information, there is a problem in that an appropriate maintenance service according to individual situations of each user cannot be provided because only the presence or absence of a predictive failure can be grasped.

For example, a user who wants to avoid the generation of down time as much as possible performs an early maintenance work in many cases even if the spare available time of part is wasted. On the other hand, a user who wants to use a part to the end of available time regardless of the generation of down time performs a maintenance work in many cases after preferably using the part for the available time even if the risk of down time is high. To provide an appropriate maintenance service according to individual situations for each user, it is important to grasp how much maintenance (emergency degree of maintenance) should be required at this time, in other words, what is a possibility (the size of failure risk) by which a failure occurs at this time. However, in the conventional method, the size of failure risk cannot be definitely grasped because two-valued information indicating whether a predictive failure is present or not is given. Therefore, in the conventional method, it was difficult to provide an appropriate maintenance service according to individual situations for each user.

Such a problem is not limited to an image forming apparatus and can occur in a device, an apparatus, and the like on which a maintenance work is performed.

SUMMARY OF THE INVENTION

It is an object of the present invention to at least partially solve the problems in the conventional technology.

According to an aspect of the present invention, there is provided a predictive failure reporting system including an information acquiring unit configured to acquire internal information of a target device; a determining unit configured to determine whether the target device is in a predictive failure state based on the internal information acquired by the information acquiring unit; a failure risk determining unit configured to perform a failure risk determination process for determining a size of a failure risk by which the target device can break down after the determining unit determines that the target device is in the predictive failure state; and a reporting unit configured to report a determination result obtained at the failure risk determining unit.

According to another aspect of the present invention, there is provided a predictive failure reporting method including acquiring internal information of a target device with an information acquiring unit; determining with a determining unit whether the target device is in a predictive failure state based on the internal information acquired at the acquiring; performing a failure risk determination process with a failure risk determining unit to determine a size of a failure risk by which the target device can break down after it is determined at the determining that the target device is in the predictive failure state; and reporting a determination result obtained at the performing.

According to still another aspect of the present invention, there is provided a method for maintaining an image forming apparatus including acquiring internal information of the image forming apparatus with an information acquiring unit; determining with a determining unit whether the image forming apparatus is in a predictive failure state based on the internal information acquired at the acquiring; taking an action beforehand so that a failure corresponding to the predictive failure state does not occur based on a determination result obtained at the determining; performing a failure risk determination process with a failure risk determining unit for determining a size of a failure risk by which the image forming apparatus can break down after it is determined at the determining that the image forming apparatus is in the predictive failure state; and reporting a determination result obtained at the performing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. However, the present invention is not limited to these embodiments.

Figure 1:
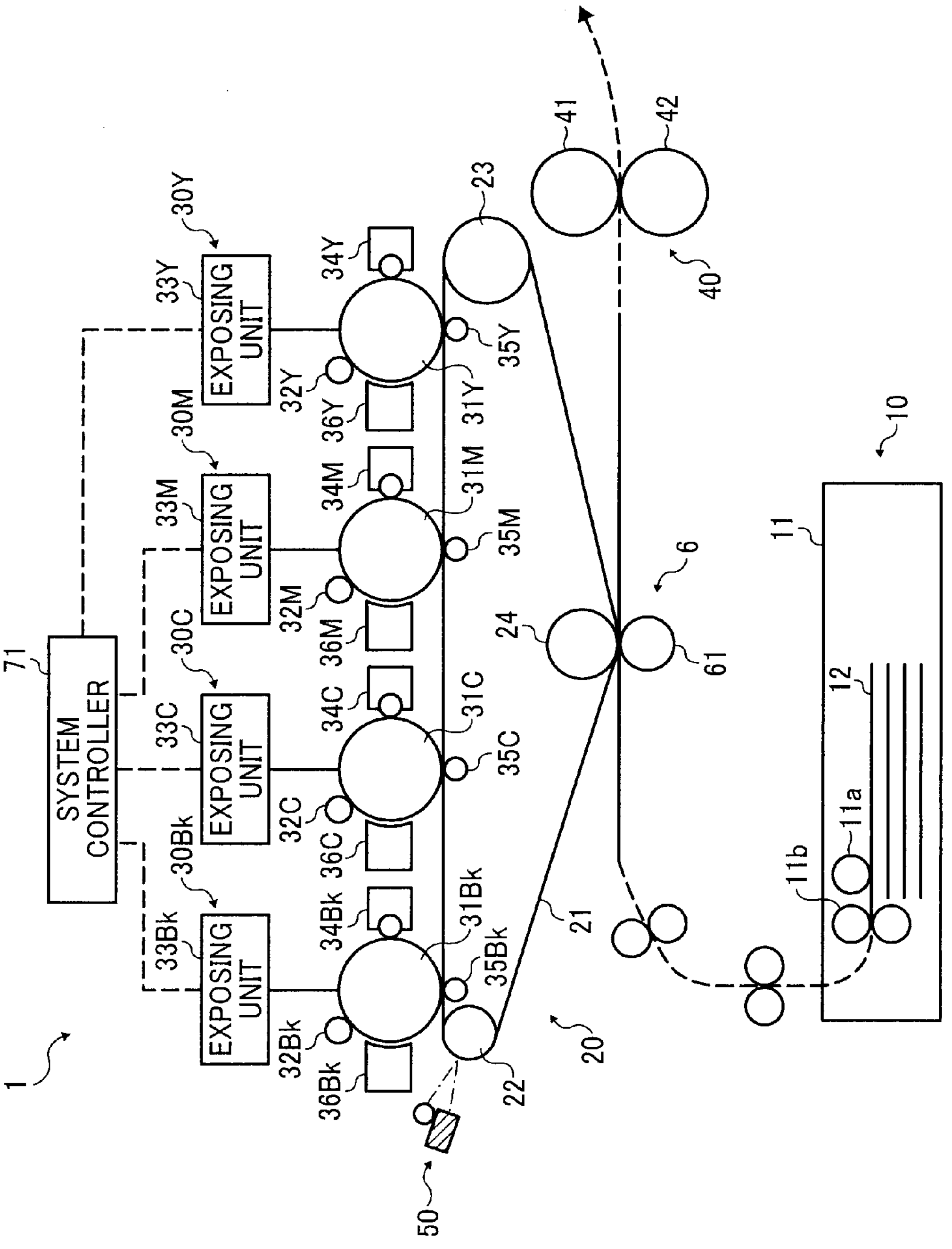
FIG. 1 is a schematic configuration diagram illustrating an example of a printer according to an embodiment.
Figure 2:
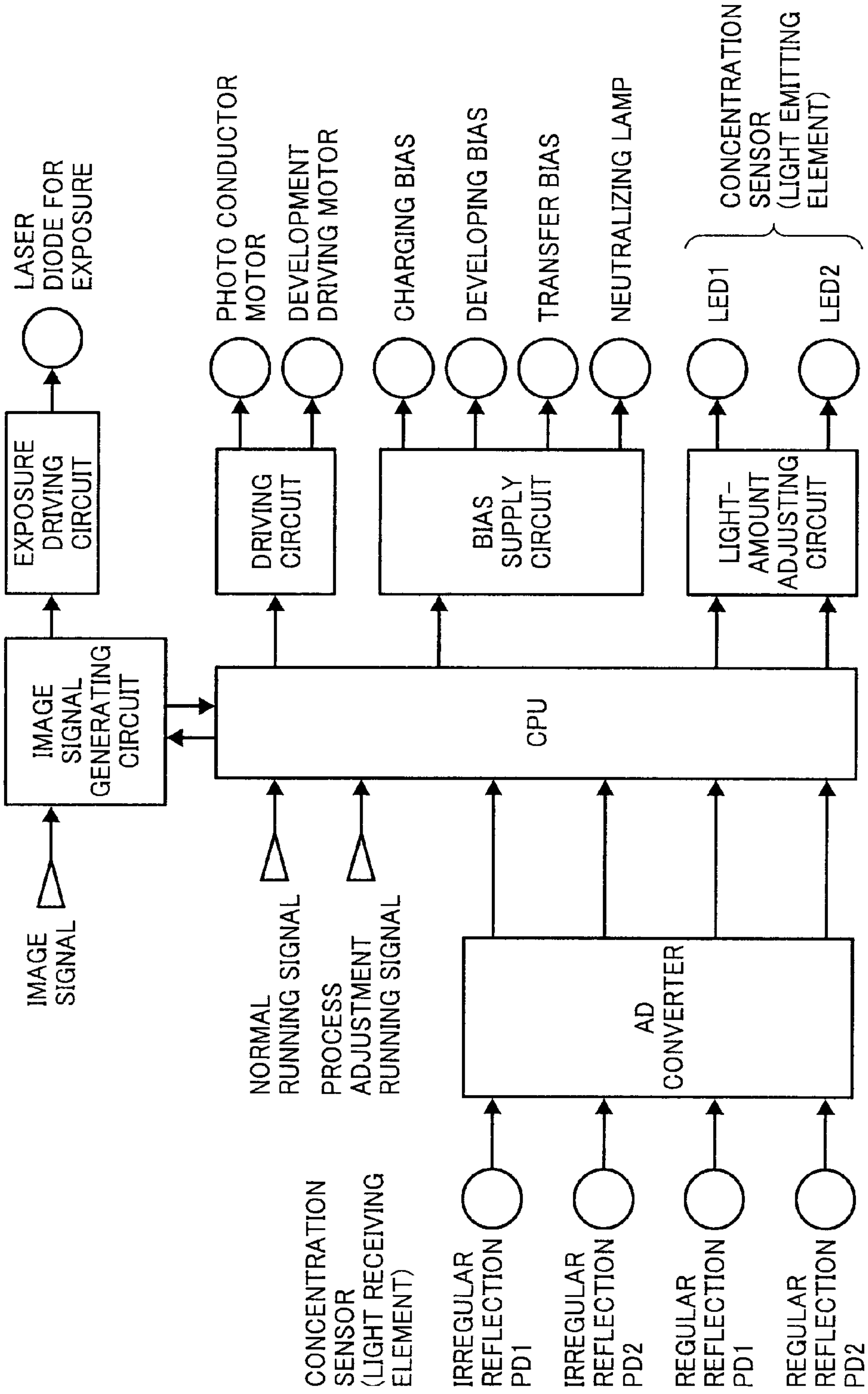
FIG. 2 is a block diagram illustrating main parts of a system controller of the printer.

Hereinafter, it will be explained about an embodiment in which the present invention is applied to an electrophotographic printer (hereinafter, "printer") that is an image forming apparatus. FIG. 1 is a schematic configuration diagram illustrating an example of a printer 1 according to the present embodiment. FIG. 2 is a block diagram illustrating main parts of a system controller 71 of the printer 1. The printer 1 according to the present embodiment includes a paper feeding unit 10, a transfer unit 20 having an intermediate transfer belt 21, and four image forming units 30Y, 30M, 30C, and 30Bk inside a main body casing. The image forming units 30Y, 30M, 30C, and 30Bk correspond to, for example, four colors of yellow (Y), magenta (M), cyan (C), and black (Bk) that are arranged along the intermediate transfer belt 21. The printer 1 further includes a fixing unit 40 and an adhesion amount detecting unit 50 that detects an adhesion amount of toner of each toner image on the intermediate transfer belt 21. Additionally, the printer 1 includes the system controller 71 that controls the image forming unit, a control unit (not shown) that control each unit of the printer 1, a motor (not shown), a drive mechanism (not shown) that transmits a driving force to each unit driven by the motor, and the like.

The structure of the image forming unit 30Bk for Bk color is explained in detail below. The other image forming units 30Y, 30M, and 30C for Y, M, and C colors have the similar configuration as that of the image forming unit 30Bk.

The image forming unit 30Bk includes a photo conductor 31Bk, a charging unit 32Bk, an exposing unit 33Bk, a developing unit 34Bk, a primary transfer unit 35Bk, and a cleaning unit 36Bk. The charging unit 32Bk, the exposing unit 33Bk, the developing unit 34Bk, the primary transfer unit 35Bk, and the cleaning unit 36Bk are arranged around the photo conductor 31Bk. When an operation signal is received from a high-order controller of the printer 1 during forming an image, the photo conductor 31Bk is rotationally driven by a driving motor (not shown) under the control of the system controller 71. Moreover, as illustrated in FIG. 2, a CPU of the system controller 71 sequentially outputs bias outputs for image forming processes, in other words, a bias output for a drive means such as a photo-conductor motor, a bias output for a charging bias, and the like. An image signal generating circuit of the system controller 71 performs an image processing such as a color conversion process on a color image signal output from an external device and outputs a Bk-colored image signal to the exposing unit 33Bk. The exposing unit 33Bk is an exposure driving circuit of the system controller 71. The exposing unit 33Bk converts the Bk-colored image signal into an optical signal and forms an electrostatic latent image by scanning and exposing the photo conductor

31Bk while blinking a laser diode for exposure based on the optical signal. The electrostatic latent image formed on the photo conductor 31Bk is developed by the developing unit 34Bk to be a Bk toner image. After that, the Bk toner image formed on the photo conductor 31Bk is transferred by the primary transfer unit 35Bk onto the intermediate transfer belt 21. After the toner image is transferred, remaining toner on the photo conductor 31Bk is cleaned by the cleaning unit 36Bk and charges on the photo conductor 31Bk are removed by a neutralizing lamp 38Bk to prepare the formation of the next image.

Similarly, the image forming units 30Y, 30M, and 30C includes charging units 32Y, 32M, and 32C, developing units 34Y, 34M, and 34C, cleaning units 36Y, 36M, and 36C, primary transfer units 35Y, 35M, and 35C, a neutralizing lamp, and the like around photo conductors 31Y, 31M, and 31C. The image forming unit 30Y, 30M, and 30C forms Y, M, and C toner images on the photo conductors 31Y, 31M, and 31C. These toner images are primary transferred to be overlapped with respect to one another on the intermediate transfer belt 21.

The printer 1 includes the transfer unit 20 at the lower side of the image forming unit. The transfer unit 20 includes the intermediate transfer belt 21 without an end, driven rollers 22 and 23, and a driving roller 24. The intermediate transfer belt 21 is an image carrier that carries a toner image consisting of a plurality of colors. The intermediate transfer belt 21 is tacked across the driving roller 24, and the driven rollers 22 and 23. The intermediate transfer belt 21 is formed of materials having high smoothness to avoid the fixation of toner. For example, the intermediate transfer belt 21 can be preferably formed of belt materials having a glossiness surface, such as PVDF (polyvinylidene fluoride) or polyimide. The driving roller 24 is rotationally driven by a drive mechanism such as a motor (not shown) under the control of the system controller 71 illustrated in FIG. 2. In this way, the intermediate transfer belt 21 is rotationally driven in a counterclockwise direction in FIG. 1. Y, M, C, and Bk toner images formed on the photo conductors 31Y, 31M, 31C, and 31Bk for all colors are primarily transferred to be overlapped with respect to one another on the intermediate transfer belt 21 by a primary transfer nip for each color. In this way, a four-colored overlapped toner image (hereinafter, “four-colored toner image”) is formed on the intermediate transfer belt 21.

In the lower portion of the intermediate transfer belt 21, the driving roller 24 faces a secondary transfer bias roller 61 that abuts on the foreside of the intermediate transfer belt 21. In this way, a secondary transfer nip 6 is formed in the lower portion of the intermediate transfer belt 21. As illustrated in FIG. 2, the secondary transfer bias roller 61 is applied with a secondary transfer bias by a bias supply circuit under the control of the system controller 71. In this way, a secondary transfer electric field is formed between the secondary transfer bias roller 61 and the driving roller (secondary-transfer-nip backside roller) 24. The four-colored toner image formed on the intermediate transfer belt 21 enters the secondary transfer nip along with the endless movement of the belt.

The paper feeding unit 10 separates one piece by one piece recording paper (transfer paper) 12 housed in a paper feeding cassette 11 by using, for example, a paper attracting unit 11*a* and a separating member 11*b* and sends away a piece of paper to a pair of registration rollers (not shown). The pair of registration rollers adjusts a timing at which the recording paper 12 is sent from the paper feeding cassette 11 and sends away the recording paper 12 toward the secondary transfer nip 6 at a predetermined timing. In the secondary transfer nip 6, the four-colored toner image formed on the intermediate transfer belt 21 is secondarily transferred onto the recording paper 12 under the actions of the secondary transfer electric field and the nipping pressure. This leads to form a full color image in combination with white of the recording paper 12.

The recording paper 12 on which a full color image is formed in this way is carried to the fixing unit 40. The fixing unit 40 heats and pressurizes the recording paper 12 by using a fixing roller 41 and a pressing roller 42 to fix all-color toner to the recording paper 12 and discharges the recording paper 12 to a catch tray (not shown) by using a pair of paper ejection rollers.

Figure 3:
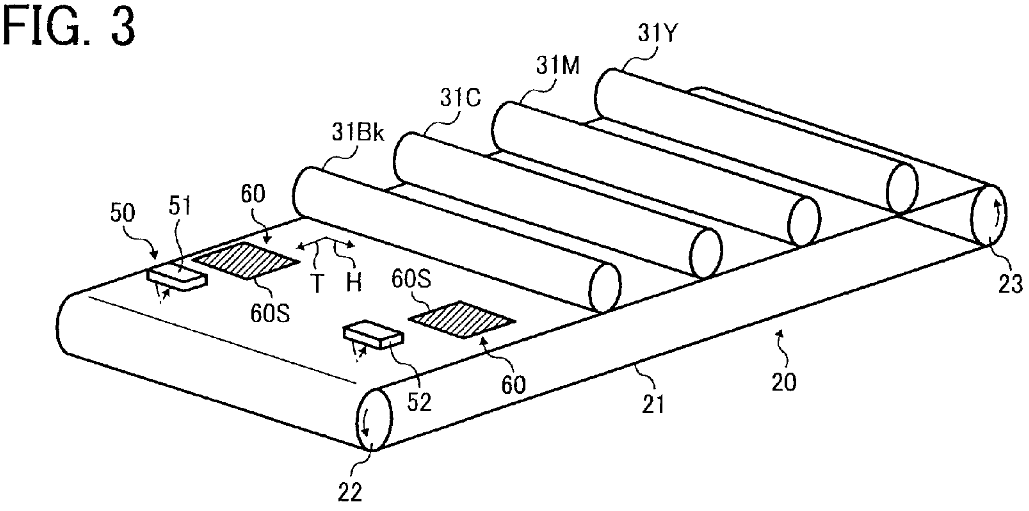
FIG. 3 is a perspective diagram illustrating a configuration example of a pattern image and an optical sensor on an intermediate transfer belt of the printer.
Figure 4A:
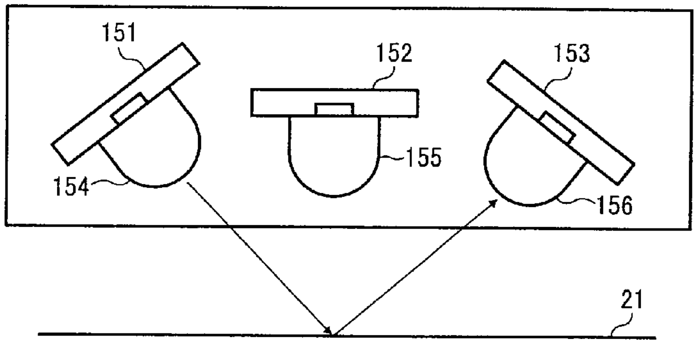
FIG. 4A is a diagram explaining a state when the optical sensor detects the surface of the intermediate transfer belt.
Figure 4B:
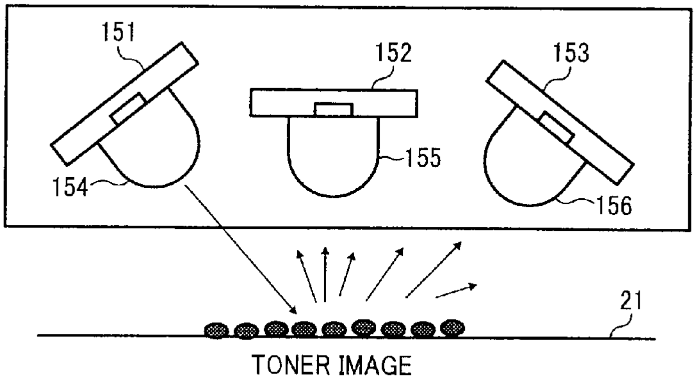
FIG. 4B is a diagram explaining a state when the optical sensor detects a toner image on the intermediate transfer belt.

The adhesion amount detecting unit 50 is arranged downstream of the image forming unit 30Bk for black (Bk) of the intermediate transfer belt 21 in the moving direction. As illustrated in FIG. 3, the adhesion amount detecting unit 50 includes optical sensors 51 and 52 that are a pair of optical sensing means that are respectively arranged in the width direction of the intermediate transfer belt 21. As illustrated in FIGS. 4A and 4B, each of the optical sensors 51 and 52 includes a light emitting element 151 that includes a light emitting diode, a first light receiving element 152 that receives diffused reflection light, a second light receiving element 153 that receives regular reflection light. The first light receiving element 152 and the second light receiving element 153 include a Si phototransistor, a photodiode (PD), and the like. The elements 151, 152, and 153 are mounted on a printed-circuit board 150. A condenser lens 154 is arranged on a light-emitting optical path. Light emitted from the light emitting element 151 is refracted by the condenser lens 154 and is condensed at the target position of the surface of the intermediate transfer belt 21 that acts as an image carrier. Moreover, condenser lenses 155 and 156 are arranged on an incident optical path. The condenser lenses 155 and 156 condense reflected light reflected from toner that is an irradiation target on the intermediate transfer belt 21. Then, the first and second light receiving elements 152 and 153 receive the condensed light. The printed-circuit board 150 is connected to the system controller 71. The light emitting element 151 is applied with a voltage that is adjusted by a light-amount adjusting circuit of the system controller 71 illustrated in FIG. 2. Moreover, the system controller 71 converts a signal output from the first and second light receiving elements 152 and 153 into a digital signal by using an analog-to-digital converter.

Figure 5:
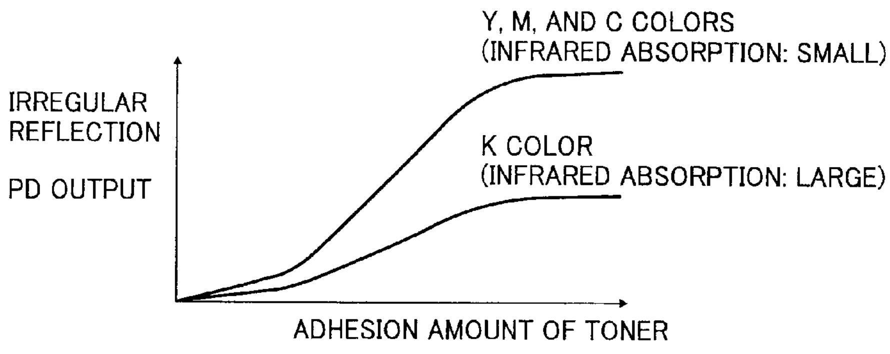
FIG. 5 is a diagram illustrating a relationship between the output value of the optical sensor and an adhesion amount of toner.

The optical sensors 51 and 52 are a device that can detect near infrared light or infrared light. Near infrared light or infrared light shows that output values of the light receiving element have substantially the same value without the influence of coloring agent of toner if adhesion amounts of toner for toner images are same. Specifically, as an example, there are used an optical element that irradiates light whose the peak emission wavelength is about 840 nm and a light receiving element that receives light whose the peak spectral sensitivity is about 840 nm. Moreover, the light emitting element and the light receiving element can be respectively a light emitting element that irradiates light from visible light to infrared light and a light receiving element that receives near infrared light or infrared light. Alternatively, the light receiving element and the light emitting element can be respectively a light receiving element that receives light from visible light to infrared light and a light emitting element that irradiates near infrared light or infrared light. Even when the optical sensor has such a configuration, the optical sensor can detect near infrared light or infrared light. When low-priced carbon black is used as coloring agent of black toner, adhesion amount detection sensitivity for black becomes low as compared to Y, M, and C colors as illustrated in FIG. 5 because carbon shows strong absorption in an infrared area.

The image forming apparatus generally performs a process adjustment operation for adjusting a developing bias, a charging bias, an exposure amount, and the like, to make image concentration of all colors adequate at the time of the application of power or whenever the predetermined number of sheets is printed. Because the electrophotographic image forming apparatus has a weak point in that image concentration varies with time degradation and under environmental variation, the image forming apparatus performs the process adjustment operation so that the image concentration has a stable value.

Figure 6:
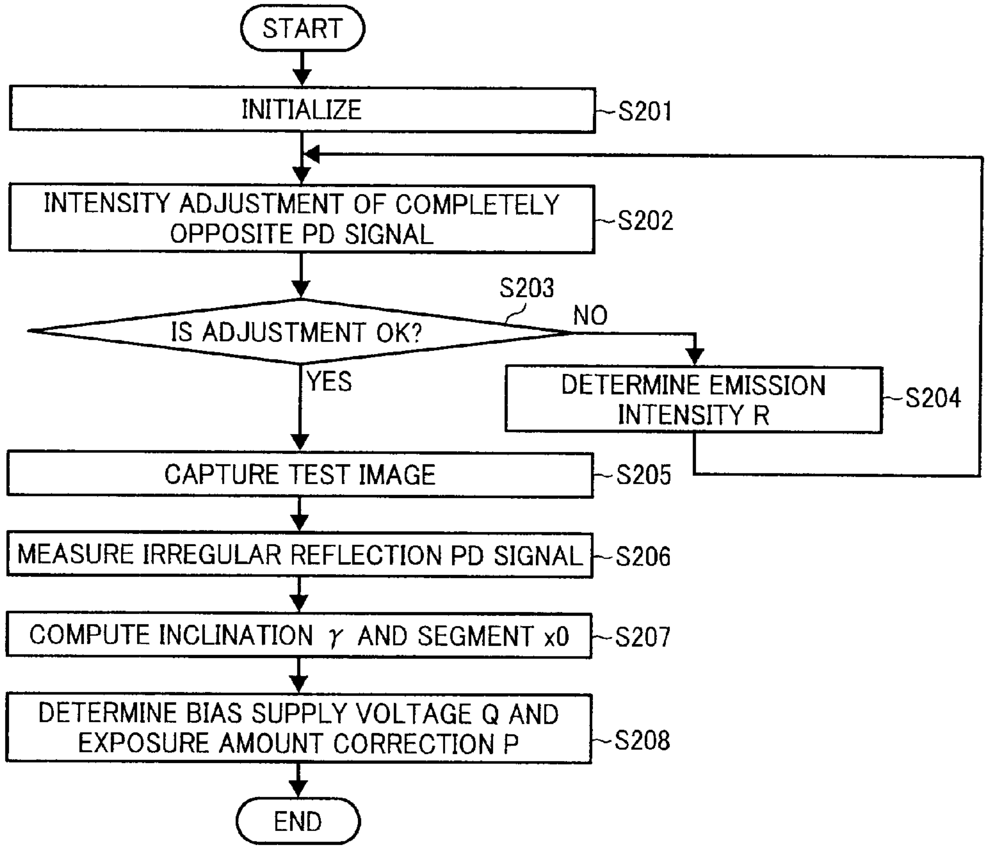
FIG. 6 is a flowchart illustrating a control flow of a process adjustment operation.
Figure 7:
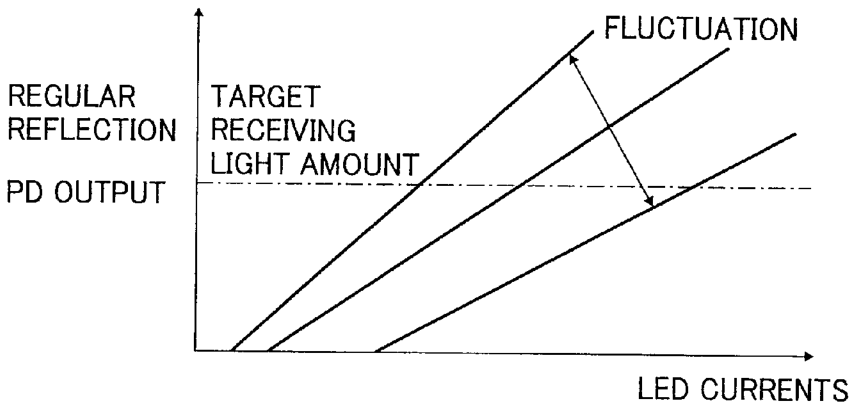
FIG. 7 is a diagram illustrating a relationship between the output value of the optical sensor and the output value of a light emitting element (LED)

FIG. 6 is a flowchart illustrating the control flow of the process adjustment operation according to the present embodiment. The system controller 71 receives a process adjustment operation signal from a high-order control apparatus at the time of the application of power or before or after the predetermined number of sheets is printed and starts the process adjustment operation (see FIG. 2). Upon starting the process adjustment operation, the system controller 71 initializes the image signal generating circuit (Step S201). Next, as illustrated in FIG. 4A, the CPU of the system controller 71 makes the light emitting element 151 irradiate light on the intermediate transfer belt 21 and the second light receiving element 153 receive regular reflection light. Then, the light-amount adjusting circuit adjusts emission intensity R of the light emitting element 151 of the optical sensors 51 and 52 so that a predetermined value is output (light receiving signal) from the second light receiving element 153 (Steps S202 to S204). This reason is that the output value of the second light receiving element 153 fluctuates due to the individual difference of luminous efficiency of the light emitting element 151, a temperature fluctuation, and a time-dependent fluctuation as illustrated in FIG. 7. Therefore, the concentration of toner image can be measured with high precision by adjusting emission intensity R of the light emitting element 151 so that the output value of the second light receiving element 153 becomes a target output value. In other words, Steps S202 to S204 correspond to calibration operations of the optical sensors 51 and 52 for measuring an adhesion amount of toner with high precision.

Figure 8:
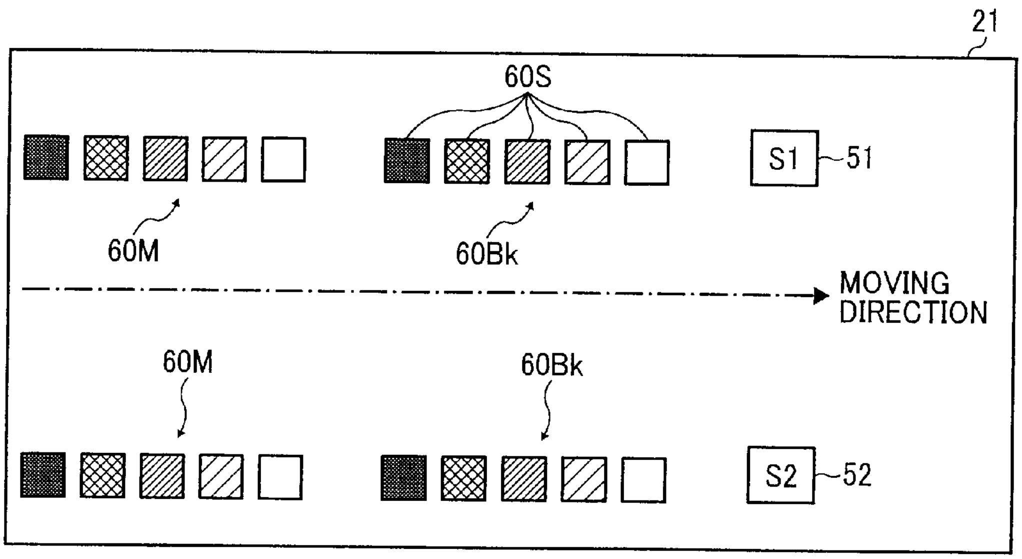
FIG. 8 is a diagram illustrating a pattern image formed on the intermediate transfer belt.

When the calibration operations of the optical sensors 51 and 52 are finished, the image forming apparatus starts forming a pattern image 60 as illustrated in FIG. 8 at positions corresponding to the optical sensors 51 and 52 on the intermediate transfer belt 21 (Step S205). The pattern image 60 consists of patch images (for example, five images) 60S that have different concentration levels. A Bk-colored pattern image 60Bk, an M-colored pattern image 60M, a C-colored pattern image 60C (not shown), and a Y-colored pattern image 60Y (not shown) are sequentially formed on the intermediate transfer belt 21. The patch images 60S are formed by changing an exposure condition. At this time, electrification and developing bias condition are performed at a predetermined specific value. The pattern image on the intermediate transfer belt is optically measured by the optical sensors 51 and 52 as illustrated in FIG. 4B (Step S206).

Next, five light receiving signals of the first light receiving element 152, which are obtained by detecting the patch images 60S for each color pattern image, are converted into an adhesion amount of toner (image concentration) by using an adhesion amount computation algorithm based on a relationship between the adhesion amount and the output value of the light receiving element as illustrated in FIG. 5. In this way, an adhesion amount of toner for each patch image 60S is detected. In this case, the optical sensor that uses near infrared light and/or infrared light has a characteristic that the first light receiving element 152 does not have difference output values depending on colors. Therefore, a common adhesion amount computation algorithm can be used without using individual adhesion amount computation algorithms for colors. However, when carbon black is used as coloring agent for black, because the output values for an adhesion amount of the light receiving element are different for Y, M, and C colors and for a Bk color as illustrated in FIG. 5, two adhesion amount computation algorithms are used for Y, M, and C colors and for a Bk color.

Figure 9:
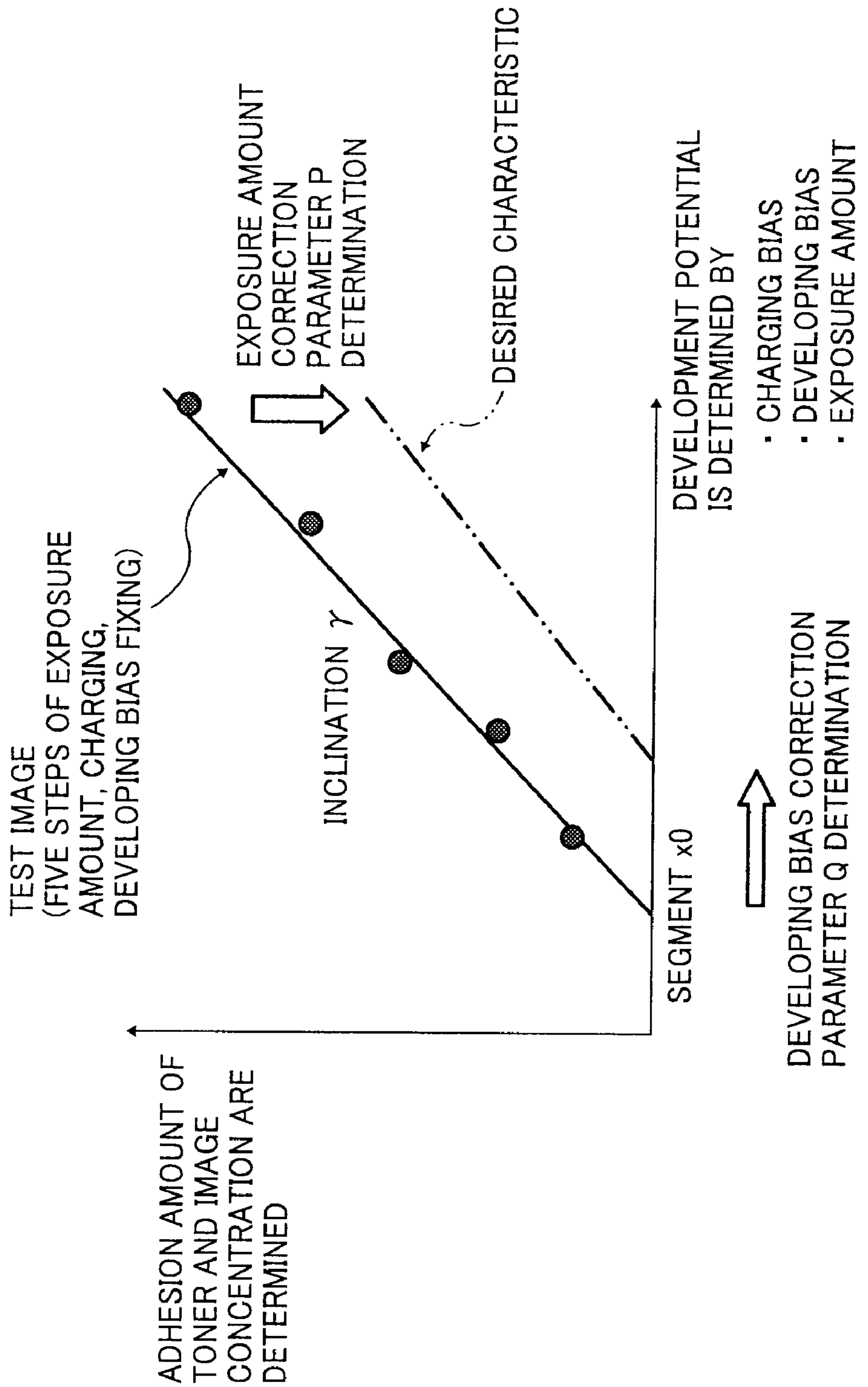
FIG. 9 is a diagram explaining a process adjustment method.

If the adhesion amount of toner for each patch image 60S is detected for each color, the image forming apparatus calculates for each color a line of an adhesion amount of toner to development potential approximate to a linear shape from a relationship between an adhesion amount of toner for each patch image and each development potential when each patch image is created, as illustrated in FIG. 9. An inclination γ and a segment x0 are computed for each color from the line of an adhesion amount of toner to development potential (Step S207). By calculating the inclination γ and segment x0 for each color in this way, the image forming apparatus can detect how much the inclination of straight line γ and the segment x0 deviate from a desired characteristic (dotted line of FIG. 9) due to the concentration fluctuation factor (time degradation and environmental variation) as described above. To correct the deviance of the inclination γ, an exposure amount correction parameter P is determined from the inclination γ. Moreover, to correct the deviance of the development potential (segment X0) at which the development is started, a correction parameter Q is determined from the segment x0 (Step S208).

The inclination γ is mainly corrected by multiplying the exposure amount correction parameter P by an exposure signal and the segment x0 is mainly corrected by multiplying the correction parameter Q by a developing bias. Therefore, a desired image concentration can be obtained stably. In the present embodiment, an exposure amount and a developing bias are corrected. However, the present invention is not limited to this. The other process control values contributing to an image concentration, such as a charged potential or a transfer current, can be corrected.

Next, it will be explained in detail about the predictive failure reporting system that predicts failure of the printer 1. The predictive failure reporting system according to the present embodiment determines whether the printer 1 is in a predictive failure state by using various types of internal information of the printer 1. The internal information is acquired in the process adjustment operation described above. Then, the predictive failure reporting system reports, as the size of failure risk, a probability by which the printer breaks down within a predetermined time (for example, ten days) from the determination time. A person who receives a report, for example, a maintenance person, or a user, can receive the device state of the printer at the determination time as quantitative information called the size of failure risk. Therefore, optimum maintenance timing can be easily determined while considering a degree of urgency of maintenance for the failure and individual situations such as printer-use frequency or image-quality importance. In this way, a down time can be largely reduced, for which the printer cannot be used without keeping constant image quality. Therefore, running efficiency of a printer improves exponentially. Moreover, the waste of supply resource such as paper caused by an image trouble can be reduced. It is preferable that internal information be a plurality of information. However, the internal information can be singular information in some cases.

Figure 10:
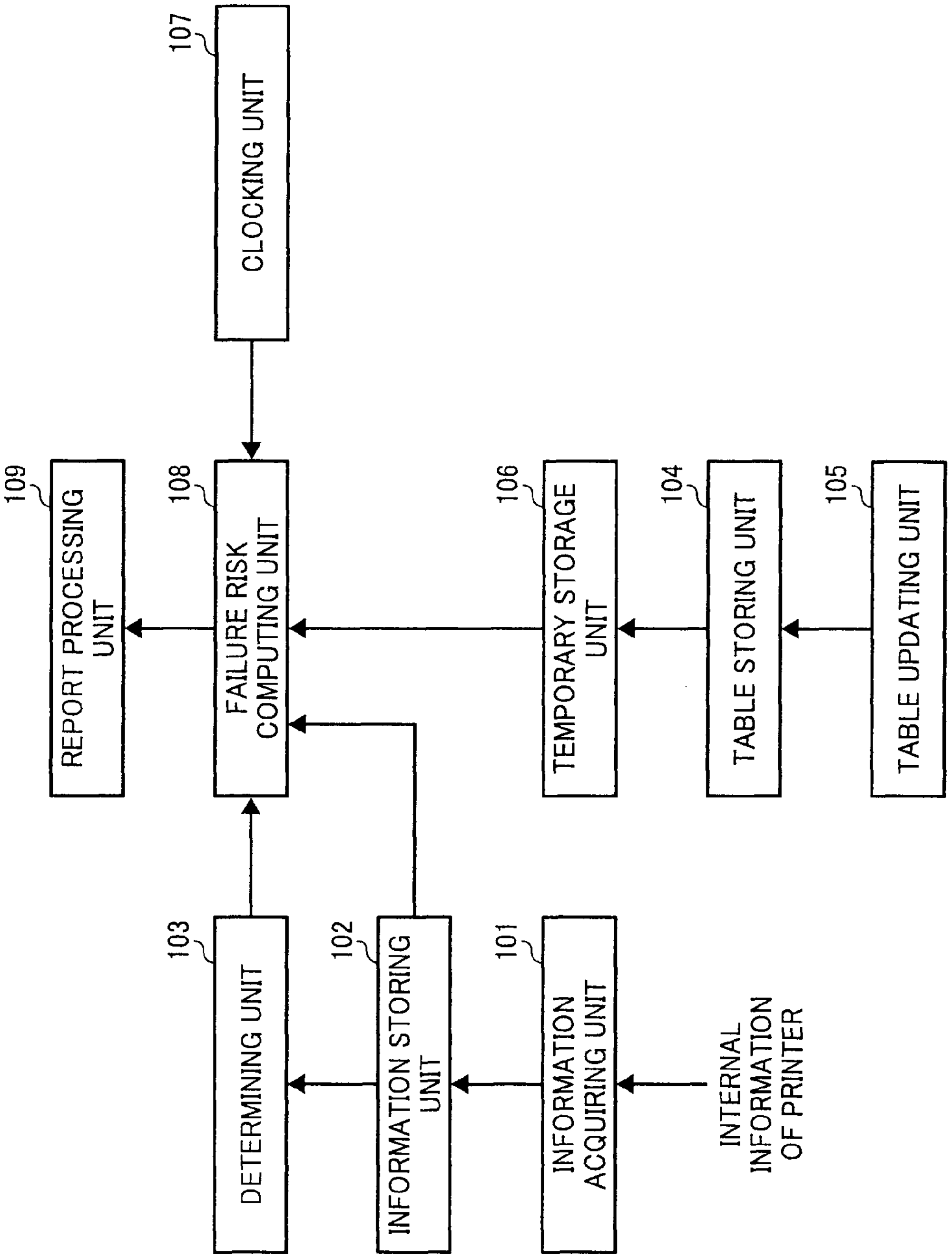
FIG. 10 is a functional block diagram of a predictive failure reporting system according to the embodiment.

FIG. 10 is a functional block diagram of the predictive failure reporting system according to the present embodiment. In the present embodiment, the predictive failure reporting system is incorporated in the printer in its entirety; however, the predictive failure reporting system can be incorporated in the printer party or as a separate device.

The predictive failure reporting system according to the present embodiment mainly includes an information acquiring unit 101, an information storing unit 102, a determining unit 103, a table storing unit 104, a table updating unit 105, a temporary storage unit 106, a clocking unit 107, a failure risk computing unit 108, and a report processing unit 109. The information acquiring unit 101 functions as an information acquiring means. The determining unit 103 functions as a determining means. The table storing unit 104 functions as a table storing means. The table updating unit 105 functions as a table updating means. The temporary storage unit 106 functions as a temporary storage means. The clocking unit 107 functions as a clocking means. The failure risk computing unit 108 functions as a failure risk determining means. The report processing unit 109 performs a report process using an information displaying unit (a display, a control panel, or the like) that functions as a reporting unit.

The information acquiring unit 101 acquires internal information of the printer 1 that is a target device. The specific hardware of the information acquiring unit 101 can vary depending on the internal information of the target device. In-device signals obtained at equal time intervals or unequal time intervals can be used as the internal information. In the present embodiment, various types of information acquired during the process adjustment operation described above are used as the internal information. Specifically, the various types of information indicate information such as charging potentials of the photo conductors 31Y, 31M, 31C, and 31Bk, exposure intensities of the exposing units 33Y, 33M, 33C, and 33Bk, the load of motor of each driving unit, detection results (adhesion amounts of toner) of the optical sensors 51 and 52, or toner concentrations of developers in the developing units 34Y, 34M, 34C, and 34Bk. Moreover, running information cumulatively increased along with the running of printer can be used as internal information, such as the running time of printer, the number of outputs, the consumption amount of toner, or the number of accumulated printing pixels. Furthermore, environmental information such as temperature or humidity in a device that fluctuates due to the change of use environment of printer can be used as internal information. In this case, internal information can be an acquired signal or information itself. Alternatively, internal information can be a signal or information that is obtained by processing the acquired signal or information.

The information storing unit 102 stores therein the internal information acquired by the information acquiring unit 101 for a predetermined period. It is preferable that the internal information include a plurality of information that is acquired at different timings so that time-dependent change can be analyzed.

The determining unit 103 performs a determination process for determining whether the printer 1 is in a predictive failure state based on the internal information stored in the information storing unit 102. In the present embodiment, for simplification of explanation, it is explained about a method for determining a predictive failure state corresponding to one kind of failure. However, the present invention is not limited this kind of failure. The image forming apparatus can include a plurality of determining units that determines a plurality of predictive failure states corresponding to various failures. In this case, one determining unit can determine whether the printer is in a predictive failure state by using one determining device or can determine whether the printer is in a predictive failure state by using two or more determining devices that have different discriminant criterion. In the latter case, the determination result of the determining unit 103 can be obtained by performing a logical product or a logical sum on the determination results of the determining devices, can be obtained by selecting the decision by majority among the determination results of the determining devices, or can be obtained by dividing the determination results of the determining devices depending on the situation. In the method for determining whether the printer is in a predictive failure state by using two or more determining devices, a part having a predictive failure can be easily specified and determination accuracy can be improved compared with the method of using one determining device.

Moreover, the determination method that can be employed by the determining unit 103 can include a well-known method. For example, a multivariate linear discriminant analysis (parametric determination) that is represented by multiple regression or logistic regression, determination based on clustering or a bifurcation tree analysis, a heuristic non-linear discriminant analysis (non-parametric determination) using a neural network, a heredity algorithm, or boosting, and the like can be utilized independently or in combination as the determination method. However, the present invention is not limited to this.

The table storing unit 104 stores therein a failure risk table that functions as table information indicative of a correspondence relationship between an elapsed time from an initial predictive time point at which the determining unit 103 first determines that the printer is in a predictive failure state and the size of failure risk. For example, the failure risk table can be created by using a knowledge database that is obtained by actually driving many similar printers and accumulating statistical data at least from an initial predictive time point at which the determining unit 103 first determines that the printer is in a predictive failure state to a time point at which the printer actually breaks down. The failure risk table according to the present embodiment is created based on a graph illustrated in FIG. 13 that indicates a relationship between the number of elapsed days and a failure risk. The number of elapsed days is the number of days elapsed from the initial predictive time point that is created based on the knowledge database. The failure risk table can have different contents depending on the type of failure or the type of determining device that determines the predictive failure state. Therefore, when the size of failure risk is calculated for many kinds of failures, it is preferable that a failure risk table is prepared for each type of determining device or each type of failure.

The table updating unit 105 updates the failure risk table stored in the table storing unit 104 based on predetermined information at a predetermined timing. In the present embodiment, the image forming apparatus adds, at a timing at which maintenance is performed on the failure corresponding to the predictive failure state, the contents (action information) of the maintenance to the knowledge database and updates the failure risk table by using the knowledge database after addition. However, the present invention is not limited to this. By adding the latest maintenance action information to the knowledge database and updating the failure risk table in this way, the accuracy (probability) of a failure risk determination process to be described below can be raised.

After the initial predictive time point and before the failure risk computing unit 108 performs the failure risk determination process, the temporary storage unit 106 temporarily stores the failure risk table stored in the table storing unit 104. In the present embodiment, the failure risk computing unit 108 to be described below reads the failure risk table from the temporary storage unit 106 and performs the failure risk determination process by using the failure risk table. The failure risk computing unit 108 can read the failure risk table from the table storing unit 104 to use the failure risk table in the failure risk determination process. However, while the failure risk computing unit 108 performs the failure risk determination process by using the failure risk table, the failure risk determination process may not be stably performed when the table updating unit 105 updates the failure risk table. In the present embodiment, the failure risk determination process can be stably performed by employing the temporary storage unit 106.

The clocking unit 107 includes a counter that measures an elapsed time from the initial predictive time point at which the determining unit 103 determines that the printer is in a predictive failure state. The clocking unit 107 outputs a measurement result (count value) to the failure risk computing unit 108.

The failure risk computing unit 108 performs the failure risk determination process for determining the size of the failure risk by which the printer 1 can break down within a predetermined time (ten days in the present embodiment) after the determining unit 103 determines that the printer is in a predictive failure state. Data used in the failure risk determination process of the present embodiment are at least the failure risk table stored in the temporary storage unit 106, the count value (elapsed time from the initial predictive time point) performed by the clocking unit 107, and the internal information (running information) acquired by the information acquiring unit 101 after the initial predictive time point. As described above, because the failure risk table is created based on statistical data from the initial predictive time point to the time point at which the printer actually breaks down, the size of failure risk can be determined based on the failure risk table and the count value of the clocking unit 107. However, the failure risk table is a generalized table and does not include individual situations such as a use status or a use environment of each printer. According to the present embodiment, because the size of failure risk is determined based on additional internal information (running information) after the initial predictive time point, the size of generalized failure risk can be corrected in accordance with individual situations such as a use status or a use environment of the printer to be determined. Therefore, the determination accuracy of failure risk can be raised. If a failure risk table is prepared for each use status or use environment of the printer, the determination accuracy of failure risk can be similarly raised. However, because a use status or a use environment of the printer is various, it is not realistic to prepare a failure risk table for each use status or use environment.

The report processing unit 109 performs a report process for reporting the size of failure risk computed by the failure risk computing unit 108 by using a control panel of the printer that functions as a reporting unit. It is enough that the failure risk is finally reported to one or more persons or organizations selected from persons or organizations associated with a maintenance service of the printer 1. For example, the person or organization indicates a user or administrator of the printer 1, an administrator of a network that links a plurality of printers, the person in charge for information management, the person in charge for maintenance service, an administrator of service, and the like. Moreover, the report process includes displaying the report on a general information displaying unit (a display, a control panel) of the printer 1, lighting or blinking of a specific information displaying unit (an alarm lamp, an indicator) of the printer 1, displaying the report on a display unit (for example, a monitor of a computer) that is directly or indirectly connected to the printer 1, communication performed by a communication network or a facsimile, and the like. In place of or in addition to a visual reporting unit, an acoustic reporting unit can be used to perform a report.

It is enough that the contents of report include at least information related to the size of failure risk computed by the failure risk computing unit 108. It is preferable that the contents of report include information related to the termination of service life of the printer and/or predetermined parts (components) constituting the printer in addition to the size information. The information related to the termination of service life can be easily grasped based on the acquired internal information, particularly running information. By reporting the information related to the termination of service life along with the size of failure risk, general time for parts replacement of the printer 1 and the failure risk of the printer 1 can be simultaneously comprehended. Therefore, a part or an area on which maintenance should be performed can be more accurately grasped. This leads to improve workability of maintenance and thus reduce a down time caused by maintenance.

Figure 11:
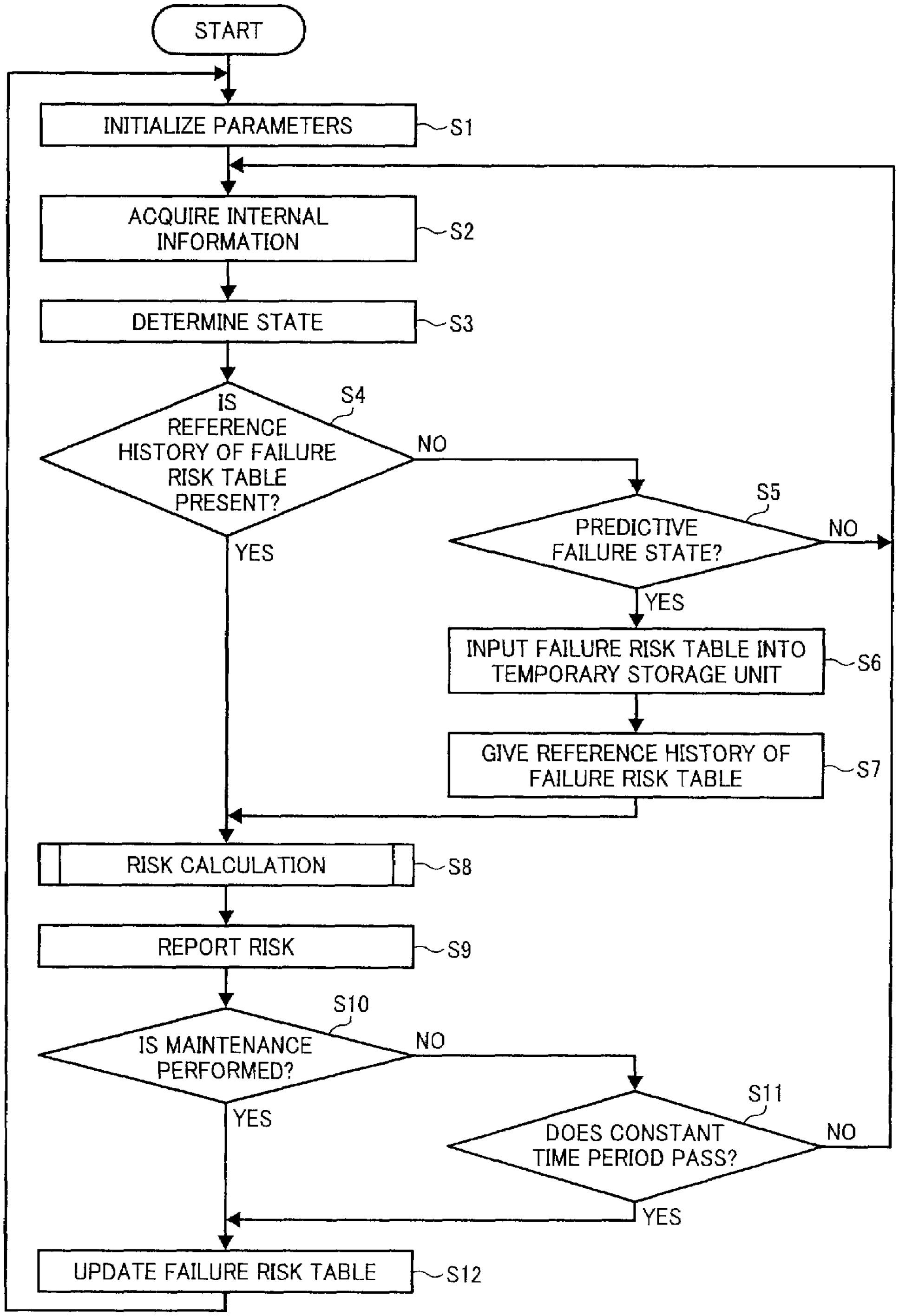
FIG. 11 is a flowchart illustrating the flow of a predictive failure reporting method using the predictive failure reporting system.

Next, it will be explained in detail about a predictive failure reporting method of using the predictive failure reporting system according to the present embodiment. FIG. 11 is a flowchart illustrating the flow of the predictive failure reporting method according to the present embodiment. When the printer 1 including the predictive failure reporting system is set, various types of parameters of the predictive failure reporting system are initialized (Step S1). When the printer 1 starts operating, the information acquiring unit 101 acquires from the printer 1 the internal information of the printer 1 needed to determine whether the printer 1 is in a predictive failure state (Step S2) and the acquired internal information is sequentially stored in the information storing unit 102. The determining unit 103 performs a determination process based on the acquired internal information at a predetermined timing (Step S3). The predetermined timing can be the time point at which process adjustment operation is performed or it can be a time point before or after the process adjustment operation. In this way, from time to time it is determined whether the printer 1 is in a predictive failure state. Subsequently, it is determined whether the failure risk table has been referred in past times (Step S4).

When it is determined that the failure risk table has not been referred in past times at Step S4, the determination result at Step S3 is collated (Step S5). Then, when the collation result does not indicate the predictive failure state, the printer 1 allowed to continue running and the information acquiring unit 101 acquires the internal information of the printer 1 on the assumption that the printer 1 is in a normal running state. On the other hand, when the collation result indicates the predictive failure state, the failure risk table stored in the table storing unit 104 is input into the temporary storage unit 106 (Step S6). At the same time as the input timing or before or after the input timing, a history of the effect that the failure risk table is referred is given for the sake of the determination at Step S4 (Step S7). After that, the size of failure risk at this time is computed by the failure risk computing unit 108 (Step S8) and the computation result is reported (Step S9).

When it is determined that the failure risk table has been referred in past times at Step S4, because the printer 1 is already in a predictive failure state at this time, the size of failure risk at this time is also computed by the failure risk computing unit 108 (Step S8) and the computation result is reported (Step S9).

Subsequently to the report of failure risk, whether an action such as parts replacement or repair is performed on at least a part or area of the printer 1 associated with the predictive failure state is collated (Step S10). When it is determined that such an action is not performed, whether a predetermined constant time period passes from the initial predictive time point at which it is determined that the printer is first in a predictive failure state is further collated (Step S11). When it is determined that the constant time period does not pass, the printer 1 continues to run while acquiring the internal information as the printer is in a failure risk state. On the other hand, when it is determined that an action is performed at Step S10 and when it is determined that a constant time period passes at Step S11, the table updating unit 105 updates the failure risk table stored in the table storing unit 104 based on each information (Step S12). In this case, various types of parameters used in the predictive failure reporting system are initialized (Step S1). The running of the printer 1 is resumed from an initial state about a target failure.

The steps of the predictive failure reporting method according to the present embodiment can be performed concurrently (in parallel) while measuring timings and each step can be further performed repeatedly by limited times. For example, in the step of acquiring internal information or the step of determining a state, the determination of state can be performed by adding internal information newly acquired in each step while sequentially dividing steps in the shape of tree.

Figure 12:
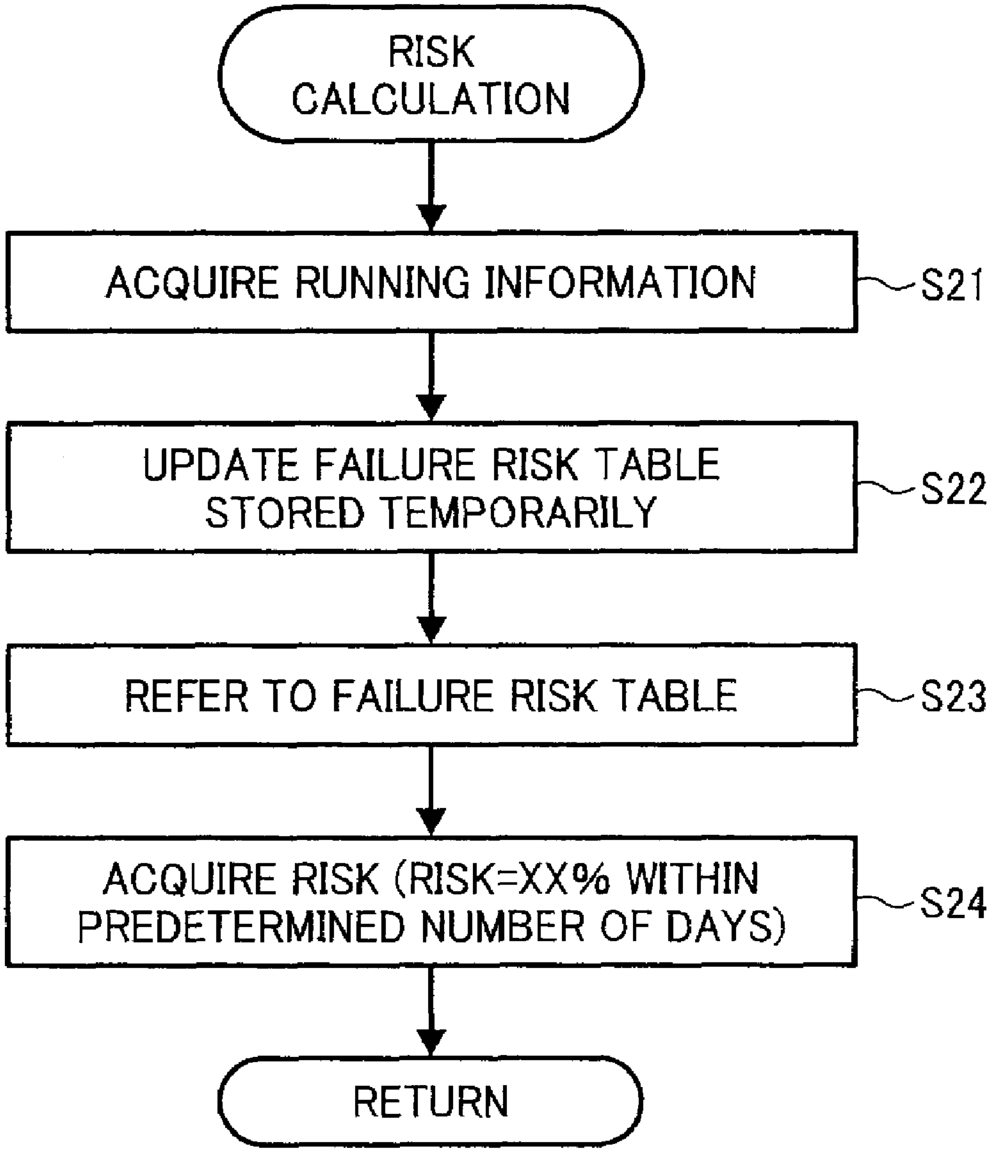
FIG. 12 is a flowchart illustrating the flow of a risk calculation method.

Next, it will be explained in detail about a failure risk calculation method according to the present embodiment. FIG. 12 is a flowchart illustrating the flow of a risk calculation method at Step S3. In the failure risk calculation method according to the present embodiment, the information acquiring unit 101 first acquires running information (internal information) for the printer 1 (Step S21). Then, the failure risk table stored in the temporary storage unit 106 is updated based on the running information acquired in Step S21 and the count value (elapsed time from the initial predictive time point) acquired by the clocking unit 107 (Step S22). In the updating step, it is preferable to update the failure risk table so that a breakdown possibility rises in the closer future when the determination result at Step S3 continuously indicates the predictive failure state, compared with the case when the determination result at Step S3 intermittently indicates the predictive failure state or does not indicate the predictive failure state halfway. In this way, after a risk report is once performed based on the generalized failure risk table before such updating, the failure risk can be corrected in accordance with individual situations of each printer and information for determination for performing an action such as maintenance at more precise time can be provided. Upon updating the failure risk table at Step S22, the updated failure risk table is referred (Step S23) and a probability by which the printer breaks down within ten days from the present time is computed as the size of failure risk (Step S24).

Figure 13:
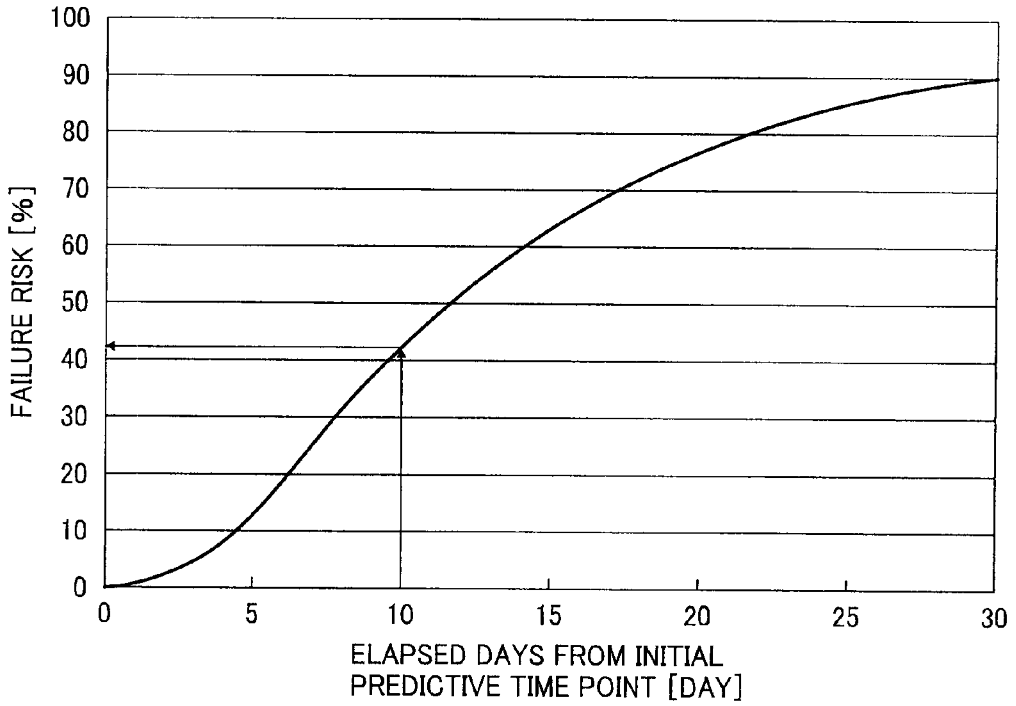
FIG. 13 is a graph illustrating a relationship between a failure risk and the number of days elapsed from an initial predictive time point created based on a knowledge database for constructing a failure risk table.

FIG. 13 is a graph illustrating a relationship between the failure risk and the number of days elapsed from the initial predictive time point created based on a knowledge database for constructing the failure risk table. The knowledge database is obtained by accumulating elapsed times (number of days) from the initial predictive time point to the time point at which the printer actually breaks down with respect to many similar printers in the early stages. The graph illustrated in FIG. 13 is obtained based on the elapsed times from the initial predictive time point to the time point at which the printer actually breaks down with respect to 100 predictive failure examples. In other words, the failure risk (%) of the vertical axis in the graph illustrated in FIG. 13 corresponds to a ratio of a cumulative value of actually broken-down printers up to the number of days elapsed from the initial predictive time point to the number (100) of printers having the possibility of failure. In the present example, because 30 printers among 100 printers have broken down within 30 days from the initial predictive time point, the maximum value of the possibility (the size of failure risk) by which printers break down within 30 days is 90%–(100–10)/100*100%. It is preferable that an early failure risk table be created based on as many examples as possible. However, because the failure risk table can be updated by additionally using examples during the running of the predictive failure reporting system as explained in Step S12, it is enough to use 50 or more examples as an early example. Furthermore, a more preferable early failure risk table can be obtained if 100 or more examples are used.

Figure 14:
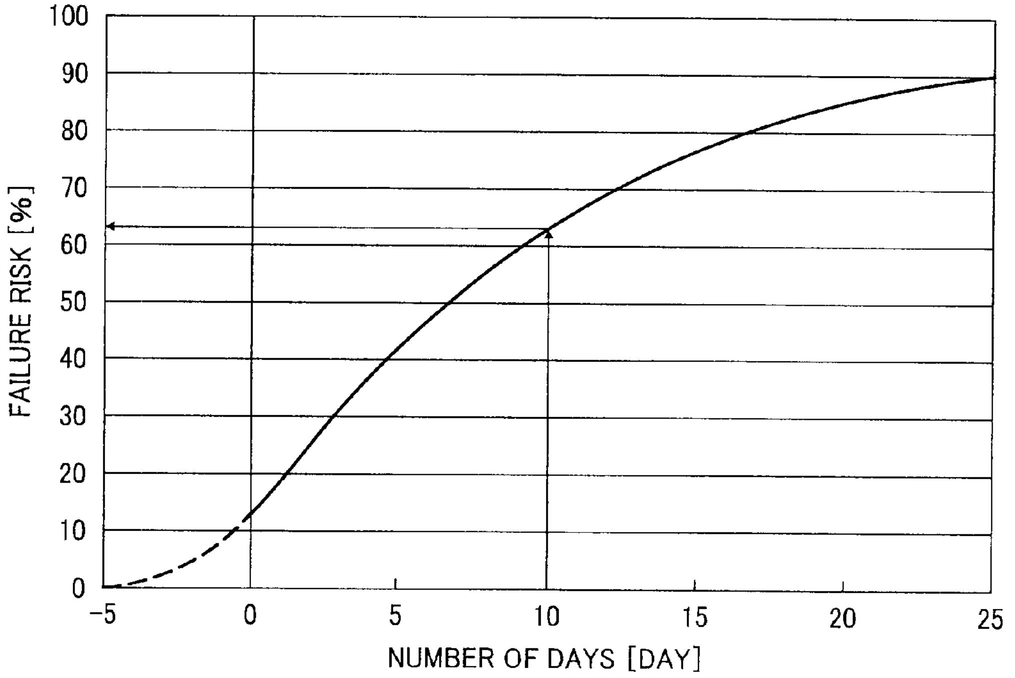
FIG. 14 is a graph that is obtained by shifting the curved line of the graph illustrated in FIG. 13 in a minus direction by the elapsed days (five days) from the initial predictive time point.

In the failure risk table based on the graph illustrated in FIG. 13, a possibility (the size of failure risk) by which printers break down from the initial predictive time point, at which it is first determined that the printer is in a predictive failure state, to 10 days becomes 42%. On the other hand, when the size of failure risk is computed at a time point after the initial predictive time point, the simplest computation method is to shift the curved line of the graph illustrated in FIG. 13 in a minus direction (left side of the diagram) by the number of elapsed days and to use a failure risk table based on the graph as illustrated in FIG. 14 whenever the number of running days of the printer 1 is updated. The graph illustrated in FIG. 14 is a graph created at the time point after five days from the initial predictive time point. In this case, the size of failure risk after five days from the initial predictive time point moves to 62%. The size of failure risk is a probability by which the printer breaks down within 10 days from the time point. In this manner, the more the elapsed time from the initial predictive time point increases, the more the failure risk increases.

Figure 15:
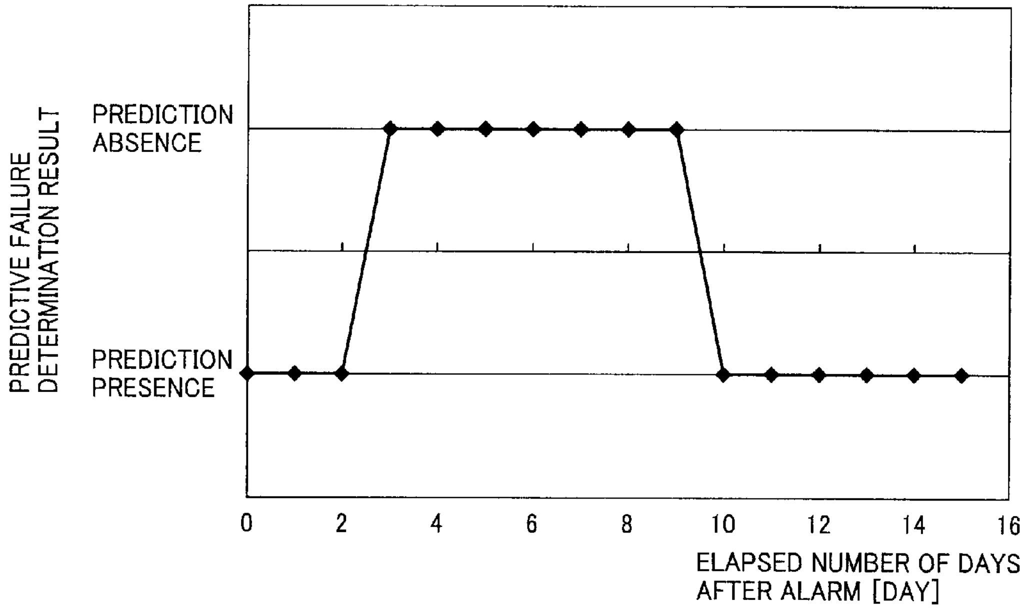
FIG. 15 is a failure state determination profile illustrating an example of a relationship between the elapsed days from the initial predictive time point and the determination result of Step S3 for 15 days from the initial predictive time point.

FIG. 15 is a failure state determination profile illustrating an example of a relationship between the elapsed days from the initial predictive time point and the determination result of Step S3 for 15 days from the initial predictive time point. In this example, it is determined that the printer is in a predictive failure state from the initial predictive time point (the reference day) to the second day. It is determined that the printer is not in a predictive failure state from the third day to the ninth day. It is determined that the printer is again in a predictive failure state from the tenth day. Because such failure state determination profiles are different depending on running conditions of the printer 1, the profiles are not fixed or half-fixed as a knowledge database. In the present embodiment, the calculation of failure risk is performed by using the failure state determination profiles.

Figure 16:
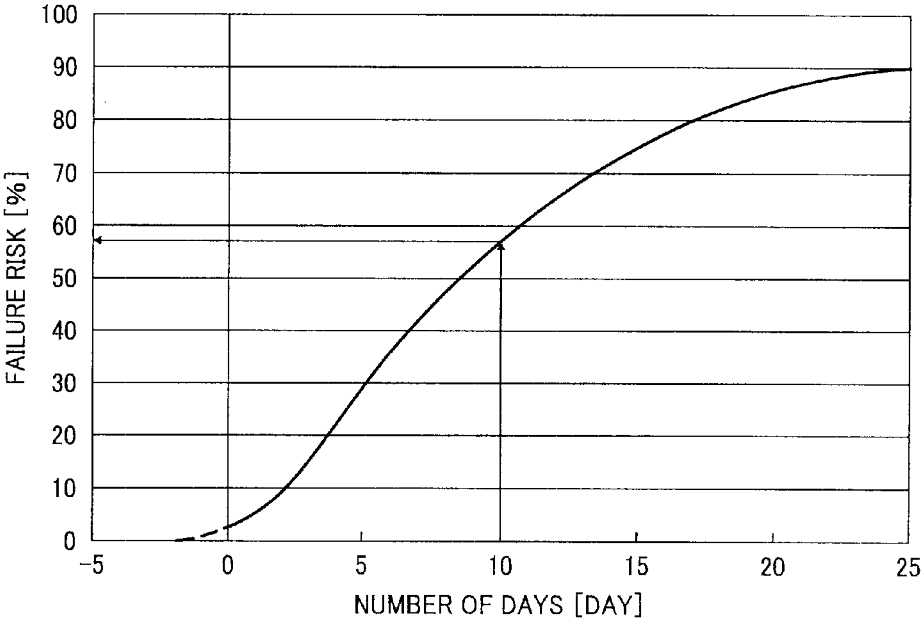
FIG. 16 is a graph when using the failure state determination profile illustrated in FIG. 15.

FIG. 16 is a graph when the failure risk table stored in the temporary storage unit 106 is updated by using the failure state determination profiles illustrated in FIG. 15. The graph illustrated in FIG. 16 is a graph at the time point after five days from the initial predictive time point. In the present embodiment, the curved line of the graph is shifted in the minus direction similarly to the above by the number of days by which the printer is in a predictive failure state. However, the curved line of the graph is not shifted in the minus direction by the number of days by which the printer is not in a predictive failure state. In this case, the contraction scale of the horizontal axis (the axis of the number of days) of the graph is shortened by one day. In the examples, the size of failure risk (probability by which the printer breaks down within ten days from the time point) at the time point after five days from the initial predictive time point becomes 57%. In this case, a failure risk becomes small compared with the case when the curved line of the graph is shifted in the minus direction by the number of days by which the printer is in a predictive failure state (the example illustrated in FIG. 14). This reason is that the determination result that the printer 1 is not in a predictive failure state after the third day was reflected as illustrated in FIG. 15.

As above, the printer 1 according to the present embodiment incorporates therein the predictive failure reporting system that includes the information acquiring unit 101 that acquires internal information of a target device (the printer 1) that functions as an image forming apparatus, the determining unit 103 that determines whether the printer 1 is in a predictive failure state based on the internal information acquired by the information acquiring unit 101, the failure risk computing unit 108 that performs a failure risk determination process for determining the size of failure risk by which the printer 1 can break down after the determining unit 103 determines that the printer is in a predictive failure state, and the reporting unit that reports the determination result of the failure risk computing unit 108. In this way, a maintenance person or a user who receive the report can definitely grasp a degree of urgency of maintenance at that point. Therefore, when the report is performed on the maintenance person, for example, an appropriate maintenance time according to individual situations of the user can be easily determined, and thus an appropriate maintenance service for each user can be easily provided. Moreover, when the report is performed on the user, for example, because the user can easily determine an appropriate maintenance time according to his circumstances, an appropriate maintenance service for each user can be easily provided.

In the present embodiment, the size of failure risk determined by the failure risk computing unit 108 indicates a probability by which the printer 1 can break down within a predetermined time (ten days) after the determining unit 103 determines that the printer is in a predictive failure state. In this way, a maintenance person or a user who receive the report can definitely grasp a degree of urgency of maintenance at that point.

The size of failure risk determined by the failure risk computing unit 108 can indicate a time at which a probability by which the printer 1 can break down after the determining unit 103 determines that the printer is in a predictive failure state reaches a predetermined probability. For example, the predictive failure reporting system reports how long a time at which a probability by which the printer 1 can break down reaches 90% takes from the present time to the back. According to the graph illustrated in FIG. 13, the predictive failure reporting system reports that a time at which a probability by which the printer 1 can break down reaches 90% is the 30th day at the initial predictive time point and reports that the time is the 25th day at the time after five days from the initial predictive time point. In this case, a maintenance person or a user who receives the report can definitely grasp a degree of urgency of maintenance at that point.

In the present embodiment, the predictive failure reporting system further includes the table storing unit 104 that stores therein the failure risk table that functions as table information indicative of correspondence relationship between the size of failure risk and the elapsed time from the initial predictive time point at which the determining unit 103 first determines that the printer is in a predictive failure state and the clocking unit 107 that measures an elapsed time from the initial predictive time point. The failure risk computing unit 108 performs the failure risk determination process by referring to the failure risk table stored in the table storing unit 104 at a predetermined timing after the initial predictive time point and determine the size of failure risk corresponding to the measurement result of the clocking unit 107. In this way, if the accuracy of the failure risk table rises, the accuracy of the reported size of failure risk can be raised.

In the present embodiment, the failure risk computing unit 108 specifies the size of failure risk by using the determination result of the determining unit 103 after the initial predictive time point. Specifically, as illustrated in FIG. 16, the curved line of the graph is shifted in a minus direction by the number of days for which the determining unit 103 determines that the printer is in a predictive failure state after the initial predictive time point. However, the size of failure risk is specified based on the failure risk table corresponding to the graph obtained by shortening the contraction scale of the horizontal axis of the graph by one day without shifting the curved line of the graph in the minus direction with respect to the number of days for which the determining unit 103 determines that the printer is not in a predictive failure state. In this way, the accuracy of the reported size of failure risk can be further raised.

In the present embodiment, using the failure risk table that is table information indicative of correspondence relationship between the internal information of the printer 1 and the size of failure risk after the initial predictive time point, the failure risk computing unit 108 specifies the size of failure risk corresponding to the internal information acquired by the information acquiring unit 101 after the initial predictive time point with reference to the failure risk table, in order to perform the failure risk determination process. In this way, because the size of failure risk can be determined in consideration of individual situations of each printer, a maintenance service such as more appropriate maintenance can be easily provided.

Particularly, in the present embodiment, because running information that is information changing over time is used as internal information acquired by the information acquiring unit 101 to determine the size of failure risk after the initial predictive time point, individual situations of each printer are appropriately grasped and the individual situations can be reflected on the size of failure risk.

In the present embodiment, when maintenance is performed on the failure corresponding to the predictive failure state, the predictive failure reporting system includes the table updating unit 105 that updates the failure risk table stored in the table storing unit 104 in accordance with the contents of the maintenance. Therefore, because the failure risk table to which the latest information is applied can be obtained, the accuracy of failure risk can be improved.

Moreover, in the present embodiment, the predictive failure reporting system further includes the temporary storage unit 106 that temporarily stores therein the failure risk table stored in the table storing unit 104 after the initial predictive time point and before the failure risk computing unit 108 performs the failure risk determination process. The failure risk computing unit 108 performs the failure risk determination process with reference to the failure risk table stored in the temporary storage unit 106. In this way, even if the failure risk table is updated by the table updating unit 105 while the failure risk computing unit 108 is using the failure risk table, the failure risk determination process can be stably performed.

As described above, the predictive failure reporting system further includes a service life determining unit that specifies the close of the service life of a predetermined component in the printer 1 based on the internal information acquired by the information acquiring unit 101. The determination result of the failure risk computing unit 108 and information related to the close of the service life of the predetermined component specified by the service life determining unit can be reported by the reporting unit. In this case, because a general time for parts replacement of the printer 1 and the failure risk of the printer 1 can be grasped simultaneously, a part or an area on which an action such as maintenance should be performed can be more accurately grasped. As a result, workability of a maintenance work can be improved and a down time caused by maintenance can be reduced.

In the present embodiment, although the predictive failure reporting system is totally incorporated in the printer that is a target device, a part or the whole of the predictive failure reporting system can be provided in a device other than the target device. For example, if the target device includes a unit that outputs internal information via a communication network, the whole of the predictive failure reporting system can be provided in a management device that is connected to the target device via the communication network. Furthermore, for example, an information acquiring unit, an information storing unit, and a determining unit can be provided in the target device and the other can be provided in the management device.

As described above, according to an aspect of the present invention, because the size of failure risk by which a target device can break down is reported after it is determined that the target device is in a predictive failure state, a maintenance person, a user, or the like who receives the report can definitely grasp what is an urgency degree of maintenance at that point. Therefore, when the report is performed on a maintenance person, for example, the maintenance person can easily determine an appropriate maintenance time according to individual situations of a user and thus can easily provide an appropriate maintenance service for each a user. When the report is performed on a user, for example, the user can easily determine an appropriate maintenance time according to his or her situations, an appropriate maintenance service can be easily provided to each user.

According to another aspect of the present invention, an appropriate maintenance service according to individual situations for each user can be easily provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A predictive failure reporting system comprising:

an information acquiring unit configured to acquire internal information of a target device;

a determining unit configured to determine whether the target device is in a predictive failure state based on the internal information acquired by the information acquiring unit, to obtain a two-valued information indicating whether the target device is in the predictive failure state;

a failure risk determining unit configured to perform a failure risk determination process for determining a size of a failure risk by which the target device can break down after the determining unit determines that the target device is in the predictive failure state; and a reporting unit configured to report the size of the failure risk determined by the failure risk determining unit.

2. The predictive failure reporting system according to claim 1, wherein the size of failure risk indicates a probability by which the target device can break down within a predetermined time.

3. The predictive failure reporting system according to claim 2, further comprising:

a storing unit configured to store therein table information indicative of correspondence relationship between the size of failure risk and an elapsed time from an initial predictive time point at which the determining unit first determines that the target device is in the predictive failure state; and a clocking unit configured to measure the elapsed time from the initial predictive time point at which the determining unit determines that the target device is in the predictive failure state, wherein the failure risk determining unit refers to the table information stored in the storing unit at a predetermined timing after the initial predictive time point and determines the size of failure risk corresponding to a measurement result of the clocking unit, to perform the failure risk determination process.

4. The predictive failure reporting system according to claim 3, the failure risk determining unit determines the size of failure risk based on a determination result of the determining unit after the initial predictive time point at which the determining unit first determines that the target device is in the predictive failure state.

5. The predictive failure reporting system according to claim 1, further comprising a storing unit configured to store therein table information indicative of correspondence relationship between the internal information of the target device and the size of failure risk after an initial predictive time point at which the determining unit first determines that the target device is in the predictive failure state, wherein the failure risk determining unit refers to the table information stored in the storing unit and determines the size of failure risk corresponding to the internal information acquired by the information acquiring unit after the initial predictive time point, to perform the failure risk determination process.

6. The predictive failure reporting system according to claim 5, wherein information changing over time is used as the internal information acquired by the information acquiring unit to determine the size of failure risk after the initial predictive time point.

7. The predictive failure reporting system according to claim 3, further comprising a table updating unit configured to update, when maintenance is performed on a failure corresponding to the predictive failure state, the table information stored in the storing unit in accordance with contents of the maintenance.

8. The predictive failure reporting system according to claim 5, further comprising a table updating unit configured to update, when maintenance is performed on a failure corresponding to the predictive failure state, the table information stored in the storing unit in accordance with contents of the maintenance.

9. The predictive failure reporting system according to claim 3, further comprising:

a table updating unit configured to update the table information stored in the storing unit; and a temporary storage unit configured to temporarily store therein the table information stored in the storing unit after the initial predictive time point and before the failure risk determining unit performs the failure risk determination process, wherein the failure risk determining unit refers to the table information stored in the temporary storage unit to perform the failure risk determination process.

10. The predictive failure reporting system according to claim 5, further comprising:

a table updating unit configured to update the table information stored in the storing unit; and a temporary storage unit configured to temporarily store therein the table information stored in the storing unit after the initial predictive time point and before the failure risk determining unit performs the failure risk determination process, wherein the failure risk determining unit refers to the table information stored in the temporary storage unit to perform the failure risk determination process.

11. The predictive failure reporting system according to claim 1, wherein the size of failure risk indicates a time period within which the target device can break down with a predetermined probability.

12. The predictive failure reporting system according to claim 1, further comprising a service life determining unit configured to determine a close of service life of a predetermined component in the target device based on the internal information acquired by the information acquiring unit, wherein the reporting unit reports the determination result of the failure risk determining unit and information related to the close of service life of the predetermined component determined by the service life determining unit.

13. A predictive failure reporting method comprising:

acquiring internal information of a target device with an information acquiring unit;

determining with a determining unit whether the target device is in a predictive failure state based on the internal information acquired at the acquiring, to obtain a two-valued information indicating whether the target device is in the predictive failure state;

performing a failure risk determination process with a failure risk determining unit to determine a size of a failure risk by which the target device can break down after it is determined at the determining that the target device is in the predictive failure state; and reporting the size of the failure risk determined at the performing.

14. A method for maintaining an image forming apparatus comprising:

acquiring internal information of the image forming apparatus with an information acquiring unit;

determining with a determining unit whether the image forming apparatus is in a predictive failure state based on the internal information acquired at the step of acquiring internal information, to obtain a two-valued information indicating whether the target device is in the predictive failure state;

taking an action beforehand so that a failure corresponding to the predictive failure state does not occur based on a determination result obtained at the step of determining whether the image forming apparatus is in a predictive failure state;

performing a failure risk determination process with a failure risk determining unit for determining a size of a failure risk by which the image forming apparatus can break down after it is determined at the determining that the image forming apparatus is in the predictive failure state; and reporting the size of the failure risk determined at the performing.

* * * * *